(12) United States Patent
Sharma et al.

(10) Patent No.: US 12,418,791 B2
(45) Date of Patent: Sep. 16, 2025

(54) BASE STATION, ACCESS MOBILITY MANAGEMENT ENTITY, EVOLVED SERVING MOBILE LOCATION CENTER AND USER EQUIPMENT

(71) Applicant: Sony Group Corporation, Tokyo (JP)

(72) Inventors: Vivek Sharma, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 15 days.

(21) Appl. No.: 17/792,144

(22) PCT Filed: Jan. 27, 2021

(86) PCT No.: PCT/EP2021/051846
§ 371 (c)(1),
(2) Date: Jul. 12, 2022

(87) PCT Pub. No.: WO2021/151933
PCT Pub. Date: Aug. 5, 2021

(65) Prior Publication Data
US 2023/0049980 A1    Feb. 16, 2023

(30) Foreign Application Priority Data

Jan. 31, 2020  (EP) .................................. 20154954

(51) Int. Cl.
*H04W 12/03*    (2021.01)
*H04W 12/041*    (2021.01)
*H04W 12/0431*    (2021.01)

(52) U.S. Cl.
CPC ......... *H04W 12/03* (2021.01); *H04W 12/041* (2021.01); *H04W 12/0431* (2021.01)

(58) Field of Classification Search
CPC ............. H04W 12/03; H04W 12/0431; H04W 12/041
See application file for complete search history.

(56) References Cited

U.S. PATENT DOCUMENTS 10,560,343 B1\*  2/2020  Cartsonis ............ H04L 41/0895
2018/0324740 A1\* 11/2018  Edge .................... G01S 5/0236
(Continued)

FOREIGN PATENT DOCUMENTS

WO    2018/204554 A1    11/2018
WO    2019/061208 A1    4/2019
(Continued)

OTHER PUBLICATIONS

Eventhelix, "5G Standalone Access Registration Signaling Messages", 2019, obtained from https://web.archive.org/web/20190117054541/https://www.eventhelix.com/5G/standalone-access-registration/details/5g-standalone-access-registration.html (Year: 2019).\*

(Continued)

*Primary Examiner* — William R Korzuch
*Assistant Examiner* — Forrest L Carey
(74) *Attorney, Agent, or Firm* — XSENSUS, LLP (57) ABSTRACT

A base station for a mobile telecommunications system, comprising circuitry configured to: obtain time-sensitive network information or enhanced positioning assistance information; encrypt the time-sensitive network information or the enhanced positioning assistance information for including the encrypted time-sensitive network information or the encrypted enhanced positioning assistance information in system information; and transmit the system information to a user equipment in a cell, wherein the encryption is performed if the cell hosts and shares functionalities of a non-public cell and a public cell.

9 Claims, 6 Drawing Sheets

(56) References Cited

U.S. PATENT DOCUMENTS

| | | | | |
|---|---|---|---|---|
| 2020/0120499 | A1* | 4/2020 | Norrman | H04L 63/061 |
| 2020/0229131 | A1 | 7/2020 | Li et al. | |
| 2020/0236544 | A1* | 7/2020 | Kunz | H04W 4/70 |
| 2021/0036920 | A1* | 2/2021 | Erman | H04L 41/0894 |
| 2021/0195563 | A1* | 6/2021 | Lee | H04W 12/041 |
| 2021/0297937 | A1* | 9/2021 | Baek | H04W 48/12 |
| 2022/0007180 | A1* | 1/2022 | Liao | H04W 12/06 |

FOREIGN PATENT DOCUMENTS

| | | | | |
|---|---|---|---|---|
| WO | 2019/096901 | A1 | | 5/2019 |
| WO | 2019/096949 | A1 | | 5/2019 |
| WO | WO-2021037355 | A1 * | 3/2021 | H04W 48/14 |

OTHER PUBLICATIONS

International Search Report and Written Opinion mailed on Mar. 30, 2021, received for PCT Application PCT/EP2021/051846, filed on Jan. 27, 2021, 10 pages.

Ericsson et al., "On representation, broadcast and ciphering of positioning SIBs", 3GPP TSG-RAN WG2 #102, R2-1808111, May 21-25, 2018, pp. 1-8.

Huawei et al., "Discussion on encryption of broadcasted assistance data", 3GPP TSG-RAN WG2 Meeting #99bis, R2-1711320, Oct. 9-13, 2017, pp. 1-2.

3GPP, "Service requirements for cyber-physical control applications in vertical domains; Stage 1 (Release 16)", 3GPP TS 22.104 V16.4.0, Dec. 2019, pp. 1-55.

3GPP, "Functional stage 2 description of Location Services (LCS) (Release 15)", 3GPP TS 23.271 V15.2.0, Dec. 2019, pp. 1-188.

3GPP, "System architecture for the 5G System (5GS); Stage 2 (Release 16)", 3GPP TS 23.501 V16.3.0, Dec. 2019, pp. 1-417.

3GPP, "Evolved Universal Terrestrial Radio Access (E-UTRA); Radio Resource Control (RRC); Protocol specification (Release 15)", 3GPP TS 36.331 V15.7.0, Sep. 2019, pp. 1-962.

3GPP, "Evolved Universal Terrestrial Radio Access (E-UTRA); Radio Resource Control (RRC); Protocol specification (Release 15)", 3GPP TS 36.331 V15.8.0, Dec. 2019, pp. 1-964.

3GPP, "Evolved Universal Terrestrial Radio Access (E-UTRA); LTE Positioning Protocol (LPP) (Release 15)", 3GPP TS 36.355 V15.5.0, Sep. 2019, pp. 1-224.

3GPP, "NR; NR and NG-RAN Overall Description; Stage 2 (Release 15)", 3GPP TS 38.300 V15.7.0, Sep. 2019, pp. 1-99.

3GPP, "NG-RAN; NG Application Protocol (NGAP) (Release 15)", 3GPP TS 38.413 V15.5.0, Sep. 2019, pp. 1-329.

* cited by examiner

BASE STATION, ACCESS MOBILITY MANAGEMENT ENTITY, EVOLVED SERVING MOBILE LOCATION CENTER AND USER EQUIPMENT

CROSS-REFERENCE TO RELATED APPLICATIONS

The present application is based on PCT filing PCT/EP2021/051846, filed Jan. 27, 2021, which claims priority to EP 20154954.0, filed Jan. 31, 2020, the entire contents of each are incorporated herein by reference.

TECHNICAL FIELD

The present disclosure generally pertains to base stations, access mobility management entities, evolved serving mobile location centers and a user equipment for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system may be based on LTE-A or NR, respectively, it is assumed that specific requirements of the 5G technologies will, basically, be dealt with by features and methods which are already defined in the LTE-A and NR standard documentation.

Additionally, for New Radio (NR) specific NR functionalities are known, such as Enhanced Mobile Broadband (eMBB), and Ultra Reliable & Low Latency Communications (URLLC).

For instance, for these functionalities an accurate timing and positioning may be useful or required, for example, in the context of industrial internet of things (IIOT) scenarios in non-public networks (NPN), which have been specified by 3GPP. A broadcast of system information including, for example, time-sensitive network information (time reference) or positioning assistance information is known and can be used to support such scenarios.

Moreover, an encryption of positioning assistance information included in broadcasted system information blocks is known.

Although there exist techniques for providing and encrypting time and positioning information in a mobile telecommunications system, it is generally desirable to improve the existing techniques.

SUMMARY

According to a first aspect the disclosure provides a base station for a mobile telecommunications system, comprising circuitry configured to:
  obtain time-sensitive network information or enhanced positioning assistance information;
  encrypt the time-sensitive network information or the enhanced positioning assistance information for including the encrypted time-sensitive network information or the encrypted enhanced positioning assistance information in system information; and
  transmit the system information to a user equipment in a cell, wherein the encryption is performed if the cell hosts and shares functionalities of a non-public cell and a public cell.

According to a second aspect the disclosure provides a base station for a mobile telecommunications system, comprising circuitry configured to:
  obtain time-sensitive network information or enhanced positioning assistance information;
  encrypt the time-sensitive network information or the enhanced positioning assistance information for including the encrypted time-sensitive network information or the encrypted enhanced positioning assistance information in system information; and
  transmit the system information to a user equipment in a cell, wherein the encryption and the transmission is performed based on commercial requirements.

According to a third aspect the disclosure provides a base station for a mobile telecommunications system, comprising circuitry configured to:
  obtain time-sensitive network information;
  obtain a cipher key from an access mobility management function entity;
  encrypt the obtained time-sensitive network information with the obtained cipher key for including the encrypted time-sensitive network information in system information; and
  transmit the system information to a user equipment in a cell.

According to a fourth aspect the disclosure provides a base station for a mobile telecommunications system, comprising circuitry configured to:
  obtain enhanced positioning assistance information from an evolved serving mobile location center;
  obtain a cipher key from an access mobility management function entity;
  encrypt the obtained enhanced positioning assistance information with the obtained cipher key for including the encrypted enhanced positioning assistance information in system information; and
  transmit the system information to a user equipment in a cell.

According to a fifth aspect the disclosure provides an access mobility management function entity for a mobile telecommunications system, comprising circuitry configured to:
  communicate with a base station and a user equipment in a cell;
  determine a cipher key with the user equipment in the cell for an access to encrypted time-sensitive network information in the cell; and
  transmit the cipher key to the user equipment in the non-public cell and to the base station for encrypting the time-sensitive network information.

According to a sixth aspect the disclosure provides an access mobility management function entity for a mobile telecommunications system, comprising circuitry configured to:
  communicate with an evolved serving mobile location center and a user equipment in a cell;
  determine a cipher key with the user equipment in the cell for an access to encrypted enhanced positioning information in the cell; and
  transmit the cipher key to the user equipment in the cell and to the evolved serving mobile location center for encrypting the enhance positioning information.

According to a seventh aspect the disclosure provides an evolved serving mobile location center for a mobile telecommunications system, comprising circuitry configured to:
  communicate with a base station and an access mobility management function entity;
  obtain a cipher key from the access mobility management function entity;
  encrypt enhanced positioning assistance information with the obtained cipher key; and
  transmit the encrypted enhanced positioning assistance information to the base station.

According to an eight aspect the disclosure provides an evolved serving mobile location center for a mobile telecommunications system, comprising circuitry configured to:
  communicate with a base station; and
  transmit enhanced positioning assistance information to the base station via an LTE positioning protocol A.

According to a ninth aspect the disclosure provides a user equipment for a mobile telecommunications system, comprising circuitry configured to:
  communicate with a base station and an access mobility management function;
  determine a cipher key with the access mobility management function entity for an access to encrypted time-sensitive network information in a cell;
  receive encrypted time-sensitive network information from the base station or encrypted enhanced assistance positioning information included in system information; and
  receive the cipher key from the access mobility management function entity for decrypting the respective received encrypted time-sensitive network information or the received encrypted enhanced assistance positioning information.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
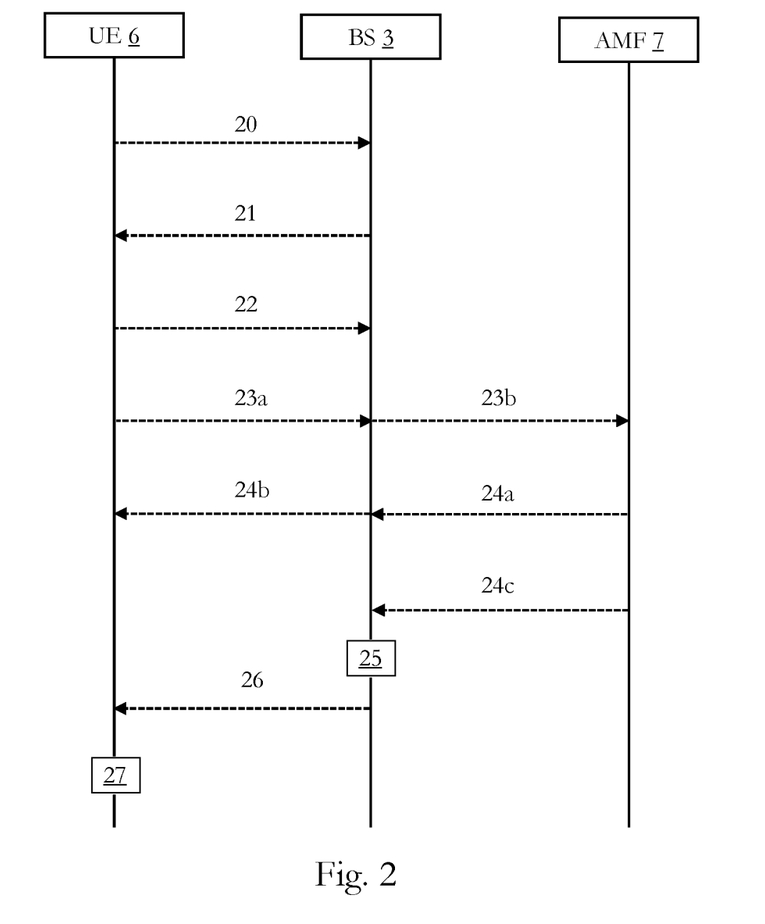
FIG. 2 illustrates in a state diagram a first embodiment of an encryption and transmission of time-sensitive network information.

Before a detailed description of the embodiments under reference of FIG. 2 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice this year.

One of the candidates for meeting the 5G requirements are termed New Radio ("NR") Access Technology Systems. Some aspects of NR can be based on LTE technology, in some embodiments, just as some aspects of LTE were based on previous generations of mobile communications technology.

Moreover, as mentioned in the outset, 3GPP has specified non-public networks ("NPN"), industrial internet of things ("IIOT"), time-sensitive network ("TSN") information, and an encryption of positioning assistance information included in system information blocks ("SIBs"). In some embodiments, an NPN is based on 5G Access Technology Systems and, in such embodiments, denoted as a non-public mobile telecommunications system.

Some of the current specified features are discussed in the following:

In some embodiments, a non-public network is a network which is deployed outside of a mobile operator network ("MNO") and it has two deployment options:
  the NPN is deployed as a Standalone NPN ("SNPN"); and
  the NPN is deployed as a part of the MNO as a Non-Standalone NPN ("NSNPN").

In some embodiments, an NPN is hosted by a public network (NSNPN), i.e. a public mobile telecommunications system, which can be realized by implementing a network slice or an access point name ("APN") for the NPN in the public network ("PN"). In such embodiments, the NPN deployment requires a cell to broadcast an NPN ID and a CAG ("Closed Access Group") ID, which is also referred to as a public network integrated-NPN ("PNI-NPN"). In some embodiments, the NPN and the public network share parts of the radio access network ("RAN") and control plane functions. As mentioned, this may be realized by implementing a network slice or the like. In such embodiments, a public network customer and the corresponding user equipment is allowed to use the RAN of the NPN (for example a base station of the NPN) for control plane functions of the public network and to receive system information from the NPN. In some embodiments, an NPN customer is also a public network customer and is allowed to register with both networks.

In a case of a SNPN, in some embodiments, a cell broadcasts a PLMN ("Public Land Mobile Network") ID (identification) and an NPN ID. In such embodiments, the PLMN ID and NPN ID may not be unique, since the SNPN is supposed to be a secluded deployment such that no interaction is foreseen between a public network.

For IIOT many sub-features are specified, in particular, for time-sensitive networking or time-sensitive communications ("TSC") (as defined in TS 23.501 3GPP), for example, a system time may be broadcasted with a granularity of 10 ns (nanoseconds) according to a text passage from 38.300 CR:

To support strict synchronization accuracy requirements of TSC applications, the gNB may signal 5G system time reference information to the UE using unicast or broadcast RRC signaling with a granularity of 10 ns. Uncertainty parameter may be included in reference time information to indicate accuracy.

As a result, a system information block 7 ("SIB") includes, in some embodiments, a new information element ("IE") for signal reference time and uncertainty in Rel-16 (Release 16), i.e. time-sensitive network information.

It has been recognized that in order to broadcast the new timing reference with such a high accuracy it may require, in addition to the broadcast of new information elements, an optimization and enhancement of a backhaul network in order to minimize a latency from a clock source to the gNB.

As mentioned in the outset, it is possible from UMTS that positioning assistance information is encrypted and that the encrypted positioning assistance information is included in SIBs, in some embodiments, for broadcasting or transmitting it to user equipments. Additionally, it has been recognized that future scenarios may require an encryption of time and positioning information depending on a specific use case. Generally, a user equipment may get the key from a mobility management entity ("MME") or access mobility management function entity ("AMF") by using an advanced encryption standard ("AES"). In such embodiments, an eNB ("eNodeB") may broadcast an OCTET string in the SIB.

Typically, the encryption of positioning assistance information is performed in an evolved serving mobile location center ("E-SMLC") as an LTE positioning protocol terminates in the E-SMLC.

However, it has been recognized that there is no differentiation between different cell types, i.e. all cells or eNBs under an E-SMLC may transfer the encrypted positioning assistance information in the SIB and any other logic e.g. an area specific broadcast of encrypted positioning assistance information in the SIB may reside in the E-SMLC. An encryption of positioning assistance information included in positioning SIBs is, for example, described in 3GPP documents TS 36.331 (V 15.8.0) and TS 36.355 (V 15.5.0).

In a future Rel-17 further assistance information may be provided in order to achieve a location information with an accuracy of 1 meter. This enhanced positioning assistance information may be encrypted like other positioning assistance information in some embodiments.

However, it has been recognized that there are reasons to encrypt the enhanced positioning assistance information differently (and similar to an encryption of TSN information), in some embodiments, if a non-public cell of an NPN (i.e. non-public mobile telecommunications system) and a public cell of a public network (i.e. public mobile telecommunications system) overlap with each other (from a user equipment point of view).

In other words, it has been recognized that in a RAN sharing scenario where a cell—generated by a base station— hosts and shares functionalities of a non-public cell (e.g. non-public network slice) and a public cell an encryption of enhanced positioning assistance information and time-sensitive network information should be performed. As mentioned above, in some embodiments, the non-public cell is either from a SNPN or a PNI-NPN and shared with a PN. In some embodiments, the cell is shared and the rest of the network infrastructure is not shared.

In a cell shared between an NPN and a public network ("PN"), i.e. a cell broadcasting both the operator PLMN ID and the NPN ID like CAG ID or NID ("Namespace Identifier"), some broadcasted information may only be required for user equipment ("UE") for the NPN, such as URLLC UEs in the NPN, since typically such information may not be needed for a PN UE.

However, it has been recognized, that, in some instances, the presence of this information may allow a development of new applications and an opening of new businesses for operators, since operators may charge providing such information to a MNO user equipment, for example, a synchronization with enhanced accuracy of 10 ns may be required for applications like gaming, XR ("VR"—virtual reality, "AR"—augmented reality), etc., in the operator network, which may not be linked to URLLC operation. Additionally, an enhanced accuracy in positioning may be useful for e.g. V2X ("vehicle-to-everything") or XR applications in a departmental store.

Figure 1:
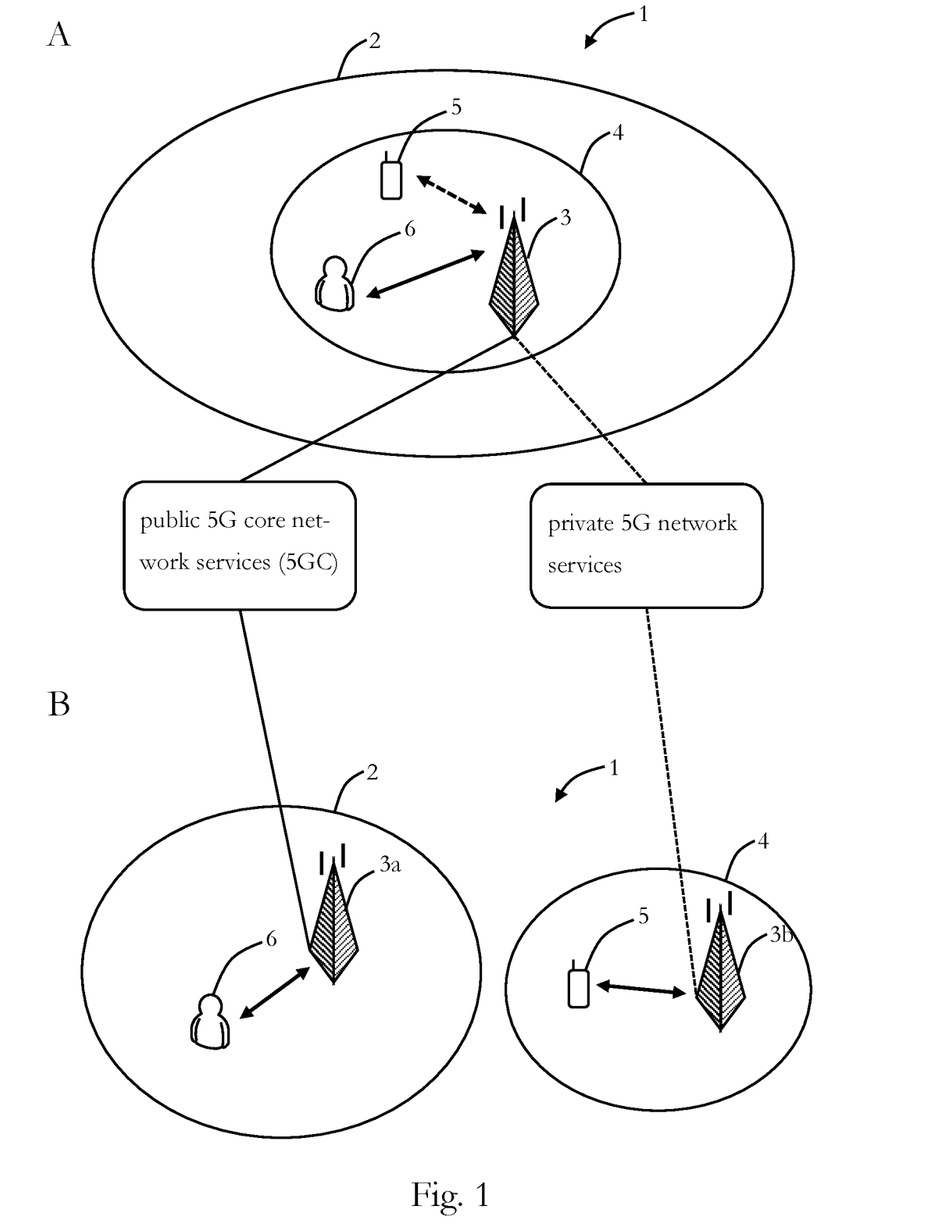
FIG. 1 illustrates schematically two embodiments of a deployment of a non-public network in a mobile telecommunications system.

For illustration of the above scenario, FIG. 1 shows schematically two embodiments of a deployment of a non-public network in a mobile telecommunications system 1.

A deployment of a non-public network as a NSNPN, i.e. a PNI-NPN, is shown in FIG. 1A.

A public cell 2 and a non-public cell 4 is generated by a base station 3 for a mobile telecommunications system (here a gNB—"next generation eNodeB"). This embodiment illustrates a RAN sharing scenario, where a cell hosts and shares functionalities of a non-public cell 4 and a public cell 2 and both cells (2 and 4) are logically part of the same cell, i.e. an NPN and a PN operator share a cell. The non-public cell 4 is illustrated smaller than the public cell 2 only for illustration purposes in order to illustrate that the non-public network is integrated in the mobile telecommunications system. Accordingly, an NPN user equipment 5, such as an NPN URLLC UE, can communicate with the base station 3 and has access to private 5G network services (illustrated by the dashed lines). A user equipment 6 can also communicate with the base station 3 and has access to the public 5G core network services ("5GC").

Thus, it has been recognized that time-sensitive network information and enhanced positioning assistance information should be encrypted before transmission from the base station 3 to the user equipment 6 in the cell in system information blocks, if the cell hosts and shares functionalities of the non-public cell 4 and the public cell 2 as shown in the embodiment of FIG. 1A.

An example deployment of a non-public network as a SNPN is shown in FIG. 1B. In a standalone NPN cell 4, as shown in the embodiment of FIG. 1B, the time-sensitive network information and enhanced positioning assistance information does not need to be encrypted, since the NPN user equipment 5, which requires the time and positioning information, camps alone on the non-public cell 4.

Thus, in some embodiments, the encryption of TSN information is required only if MNO UEs also camp on the same cell along with e.g. NPN URLLC UEs. If a SNPN network or standalone CAG cell exists, then the MNO UEs may not camp on these cells and, thus, there may be no need to encrypt the TSN information or the enhanced positioning assistance information, which may provide an accuracy of 1 meter, as these enhancements may be required mainly for URLLC UEs.

As mentioned above, the availability of this information for MNO UEs may open new business for MNO and operators may like to broadcast this information with encryption so that the selected MNO UEs are able to use this information.

Consequently, it has been recognized that in order to avoid, for example, that URLLC UEs camped on a standalone NPN cell always decrypt TSN information and enhanced positioning assistance information, a selective encryption of TSN information and enhanced positioning assistance information should be performed in the network. Thus, for example, either an AMF entity or a gNB or an E-SMLC (for positioning information) decides, if the encryption should be performed or not based on the cell configuration, i.e. if a shared cell exists.

Hence, some embodiments pertain to a base station for a mobile telecommunications system, including circuitry configured to:
  obtain time-sensitive network information or enhanced positioning assistance information;
  encrypt the time-sensitive network information or the enhanced positioning assistance information for including the encrypted time-sensitive network information or the encrypted enhanced positioning assistance information in system information; and
  transmit the system information to a user equipment in a cell, wherein the encryption is performed if the cell hosts and shares functionalities of a non-public cell and a public cell.

The base station may be an eNodeB, a NR gNB, or the like as a part of the non-public mobile telecommunications system, which may be based on UMTS, LTE, LTE-A, or an NR, 5G system or the like.

In some embodiments, the mobile telecommunications system includes standalone network functions to provide the time-sensitive network information and the enhanced positioning assistance information. In some embodiments, the mobile telecommunications system has access to network functions for obtaining the time-sensitive network information and the enhanced positioning assistance information.

The circuitry may include at least one of: a processor, a microprocessor, a dedicated circuit, a memory, a storage, a radio interface, a wireless interface, a network interface, or the like, e.g. typical electronic components which are included in a base station, such as an eNodeB, NR gNB, a user equipment, or the like. It may include an interface, such as a mobile telecommunications system interface which is adapted to provide communication to and/or from the mobile telecommunications system. It may also include a wireless interface, e.g. a wireless local area network interface, a Bluetooth interface, etc.

The encryption may be based on any ciphering algorithm typically used in a mobile telecommunications system and it may be based on block mode or counter mode ciphering. In some embodiments, the encryption is based on a cipher key obtained from a network function entity, such as an access mobility management function entity, and the cipher key is also known to the user equipment for decrypting the encrypted time-sensitive network information or the encrypted enhanced positioning assistance information included in the system information.

The system information may be a system information block or information element specified by 3GPP for the purpose of broadcasting TSN information and enhanced positioning assistance information, as mentioned above, or it may be a new system information block to be included in further specifications for that purpose.

Moreover, in some embodiments, the encryption of the enhanced positioning assistance information is based on an encryption/decryption in the packet data convergence protocol ("PDCP") as described in WO 2019/096901 A1 and WO 2019/096949 A1, the content of which is incorporated by reference (at least the content referring to the packet data convergence protocol).

The user equipment may be or may include a smartphone, a VR device, a laptop or the like. The circuitry may include at least one of: a processor, a microprocessor, a dedicated circuit, a memory, a storage, a radio interface, a wireless interface, a network interface, or the like, e.g. typical electronic components which are included in a user equipment to achieve the functions as described herein.

Additionally, a cell of a mobile telecommunications system which does not have any NPN functionality, i.e. NPN deployments do not exist in the cell as shown in FIG. 1B, may broadcast or transmit encrypted time-sensitive network information and encrypted enhanced positioning assistance information based on a commercial requirement, such as a (valid) subscription or a capability of the user equipment or other credentials of the user equipment. In addition, any UEs which require this information, such as URLLC UEs, may need to support a decryption of this information.

Hence, some embodiments pertain to a base station for a mobile telecommunications system, including circuitry configured to:
  obtain time-sensitive network information or enhanced positioning assistance information;
  encrypt the time-sensitive network information or the enhanced positioning assistance information for including the encrypted time-sensitive network information or the encrypted enhanced positioning assistance information in system information; and
  transmit the system information to a user equipment in a cell, wherein the encryption and the transmission is performed based on commercial requirements.

Thus, the TSN information or the enhanced positioning assistance information is encrypted before transmission and included in system information. However, the details for TSN and enhanced positioning assistance information may be different.

Currently, the 3GPP systems support encryption of positioning assistance information included in system information only and the positioning assistance information is encrypted by the E-SMLC. However, in some embodiments, the E-SMLC should not perform the encryption of TSN information, since the E-SMLC has no role in delivering the TSN information.

Thus, it has been recognized that a new entity is required, in some embodiments, where encryption could be performed. In some embodiments, the encryption of TSN information is performed in the gNB (i.e. a base station) and keys are distributed involving the core network of a mobile telecommunications system.

Hence, some embodiments pertain to a base station for a mobile telecommunications system, including circuitry configured to:
  obtain time-sensitive network information;
  obtain a cipher key from an access mobility management function entity;
  encrypt the obtained time-sensitive network information with the obtained cipher key for including the encrypted time-sensitive network information in system information; and
  transmit the system information to a user equipment in a cell.

An access mobility management function entity is generally known in a mobile telecommunications system and includes circuitry including at least one of: a processor, a microprocessor, a dedicated circuit, a memory, a storage, a radio interface, a wireless interface, a network interface, or the like, e.g. typical electronic components. It may include an interface, such as a mobile telecommunications system interface which is adapted to provide communication to and/or from the mobile telecommunications system. It may also include a wireless interface, e.g. a wireless local area network interface, etc. It may be a combination of electronic components and software functions and it may be distributed in a cloud or on a plurality of servers or the like to perform the functions as described herein.

In some embodiments, the access mobility management function entity determines the cipher key with the user equipment based on a (valid) subscription and the user equipment capability or other credentials of the user equipment. In such embodiments, the determination of the cipher key with the UE and the distribution to the UE can be based on any non-access stratum ("NAS") signaling message between the UE and the AMF. Moreover, in such embodiments, the UE is in an RRC_Connected mode ("RRC"—radio resource control) after connection establishment with the base station. A cipher key is known to the skilled person per se, and, thus, a general description of it is omitted.

In some embodiments, the cipher key, which is unique for a base station or a cell, is transferred from the AMF entity to the base station in any message or procedure typically exchanged between a base station and an AMF entity, for example, interface management procedures such as NG setup, AMF configuration transfer or RAN configuration transfer or the like. In some embodiments, the cipher key is included in the message exchanged.

When the base station obtains the cipher key, the base station is able to encrypt the TSN information and include it in system information (e.g. a system information block) and to transmit it to the user equipment in the non-public cell, as mentioned above.

Generally, enhanced positioning assistance information can be provided by an E-SMLC, which has the base station for transmission to the user equipment under its control. Moreover, the encryption can be performed by the base station instead of the E-SMLC in some embodiments.

Hence, some embodiments pertain to a base station for a mobile telecommunications system, including circuitry configured to:
  obtain enhanced positioning assistance information from an evolved serving mobile location center;
  obtain a cipher key from an access mobility management function entity;
  encrypt the obtained enhanced positioning assistance information with the obtained cipher key for including the encrypted enhanced positioning assistance information in system information; and
  transmit the system information to a user equipment in a cell.

In some embodiments, as mentioned above, the encryption of the obtained time-sensitive network information or the encryption of the obtained enhanced positioning assistance information is performed if the cell shares and hosts functionalities of a non-public cell and a public cell. The sharing of different cells, i.e. cell configuration, is generally known to the base station and, thus, the base station can selectively decide about an encryption depending on the concrete deployment of the non-public mobile telecommunications system.

In some embodiments, there are two options regarding whether an encryption of the TSN information or the enhanced positioning information should be performed or not:
  the AMF entity determines to transmit the cipher key to the base station based on at least one of a geographical area or an obtained indication from the base station of the cell hosting and sharing functionalities of a non-public cell and a public cell during a (NG) setup procedure (NG setup procedure is explained in TS 38.413 3GPP) in some embodiments; and
  the base station receives the cipher key from the AMF entity and determines to encrypt the information based on a local policy, i.e. a sharing between the non-public cell and a public cell, as mentioned above, in some embodiments.

In embodiments implementing the first option, the encryption is performed in the base station when the cipher key is obtained from the access mobility management function entity.

In some embodiments, the circuitry of the base station is further configured to transmit an indication of the cell hosting and sharing functionalities of a non-public cell and a public cell during NG SETUP procedure to the access mobility management function entity.

As mentioned above, in some embodiments, the cipher key is obtained from the access mobility management function entity in a message. The message may be any message typically exchanged between a base station and an AMF entity.

The base station transmits the system information including the encrypted TSN information or enhanced positioning assistance information to the user equipment in the cell and the user equipment can obtain the respective information by decrypting it based on the cipher key, which has been obtained from the AMF entity, on receiving the system information. As mentioned above, the generation of the cipher key may be based on a counter mechanism due to an advantage of bit-level encryption by avoiding a man-in-the-middle attack by maintaining the counter value.

Thus, in some embodiments, the generation of the cipher key is based on a counter mechanism.

In some embodiments, a cipher key is not valid forever and a key update procedure is needed, which allows a deactivation of the subscription.

One option is that a validity timer is associated with the key and on expiry of this validity period, the UE must re-acquire a new key by transitioning to an RRC_Connected mode (based on a subscription of the user equipment, i.e. the user equipment does not necessarily transition to the RRC_Connected mode).

Hence, in some embodiments, a validity timer is associated with the obtained cipher key.

Another option is that the base station transmits (e.g. broadcasts) a change of security parameters, such as a change in the cipher key, a validity period, a change of security algorithm, a counter value re-initialization or the like, which can be indicated by information in a message (e.g. one or more bits included in a broadcast message). The user equipment can receive the broadcasted indication and can acquire the new security parameters from the AMF entity. On receiving this broadcast indication, all interested UEs go to an RRC_Connected mode in order to receive the new key or security parameters.

Thus, in some embodiments, the circuitry of the base station is further configured to:
  obtain an indication of a change in security parameters from the access mobility management function entity; and
  transmit the obtained indication of the change in security parameters to the user equipment in the cell.

In such embodiments, a user (equipment) can deactivate its subscription to TSN information or enhanced positioning information any time, but actual disconnection of service may be linked to e.g. receiving the new parameters.

In some embodiments, the security parameters include at least one of the cipher key, a validity period, a security algorithm and a counter value reinitialization.

In some embodiments, the enhanced positioning assistance information is obtained by the base station from the evolved serving mobile location center via an LTE positioning protocol A ("LPPa"), and wherein the encryption is performed when the enhanced positioning assistance information is obtained from the evolved serving mobile location center or if the cell shares and hosts functionalities of a non-public cell and a public cell.

Moreover, in some embodiments, the system information transmitted to the user equipment in the cell includes information for indicating the user equipment whether the time-sensitive network information included in the system information is encrypted.

Accordingly, in some embodiments, the system information transmitted to the user equipment in the cell includes information for indicating the user equipment whether the enhanced positioning information included in the system information is encrypted.

The information included in the transmitted system information, i.e. one or more system information blocks, may include one or more bits to indicate if the time-sensitive network information or the enhanced positioning assistance information included in the system information is encrypted.

According to the embodiments described herein, some embodiments pertain to a user equipment for a mobile telecommunications system, including circuitry configured to:
  communicate with a base station and an access mobility management function;
  determine a cipher key with the access mobility management function entity for an access to encrypted time-sensitive network information in a cell;
  receive encrypted time-sensitive network information from the base station or encrypted enhanced assistance positioning information included in system information; and
  receive the cipher key from the access mobility management function entity for decrypting the respective received encrypted time-sensitive network information or the received encrypted enhanced assistance positioning information.

In some embodiments, the circuitry of the user equipment is further configured to determine whether the time-sensitive network information or the enhanced assistance positioning information included in the system information is encrypted based on information included in the system information.

As mentioned above, in some embodiments, the information may be one or more bits for indicating the encryption, which can be identified by the circuitry of the user equipment.

In some embodiments, the circuitry of the user equipment is further configured to determine its capability to decrypt the received encrypted time-sensitive network information or encrypted enhanced positioning assistance information included in the system information based on the received cipher key.

As mentioned above, in some embodiments, the cipher key is based on a subscription of the user equipment (e.g. the cipher key may expire after some time). Thus, the circuitry of the user equipment is configured, in some embodiments, to determine if the cipher key can decrypt the received encrypted time-sensitive network information or encrypted enhanced positioning assistance information included in the system information. The correct decryption may be indicated by one or more bits or the like. If encryption cannot be performed, the circuitry of the user equipment may initiate a procedure to acquire a new cipher key or it may transmit a failure message or the like.

In some embodiments, a validity timer is associated with the cipher key, and the user equipment transitions to an RRC_Connected mode for determining and receiving a new cipher key in response to an expiry of the validity timer based on a subscription of the user equipment.

Upon expiry of the validity timer the user equipment will not be able to decode system information further and this decision is already based on a subscription of the user equipment and, thus, in some embodiments, the user equipment does not necessarily transition to the RRC_Connected mode upon expiry of the validity timer.

In some embodiments, the circuitry of the user equipment is further configured to obtain an indication of a change in security parameters transmitted from the base station, and the user equipment transitions to an RRC_Connected mode for obtaining a new cipher key or new security parameters in response to the obtained indication.

According to the embodiments described herein, some embodiments pertain to an access mobility management function entity for a mobile telecommunications system, including circuitry configured to:
  communicate with a base station and a user equipment in a cell;
  determine a cipher key with the user equipment in the cell for an access to encrypted time-sensitive network information in the cell; and transmit the cipher key to the user equipment in the cell and to the base station for encrypting the time-sensitive network information.

As described above, an access mobility management function entity is generally known in a mobile telecommunications system and the AMF entity may be part of the non-public mobile telecommunications system or the public mobile telecommunications system. In some embodiments, the AMF entity communicates with the base station via a network interface, as generally known, and with the user equipment via the base station.

In some embodiments, as mentioned above, the determination of the cipher key with the UE and the distribution to the UE can be based on any NAS signaling message between the UE and the AMF entity.

In some embodiments, the circuitry of the AMF entity is further configured to:
obtain an indication from the base station of the cell sharing and hosting functionalities of a non-public cell and a public cell during a setup procedure; and
determine to transmit the cipher key to the base station based on at least one of the obtained indication and a geographical location of the user equipment or the base station.

The indication may be information represented by one or more bits in a message transmitted from the base station.

In some embodiments, the circuitry of the AMF entity is further configured to transmit an indication of a change in security parameters to the base station (as also explicated above).

As described above, an encryption of positioning assistance information can be performed by a base station, however, the encryption can also be performed in the E-SMLC.

Hence, in some embodiments, the AMF entity determines to transmit the cipher key to an E-SMLC.

Moreover, in some embodiments, the AMF entity transmits an indication of a cell sharing and hosting functionalities of a non-public cell and a public cell to the E-SLMC, which has been obtained from the base station during a setup procedure to the access mobility management function entity.

According to the embodiments described herein, some embodiments pertain to an access mobility management function entity for a mobile telecommunications system, including circuitry configured to:
communicate with an evolved serving mobile location center and a user equipment in a cell;
determine a cipher key with the user equipment in the cell for an access to encrypted enhanced positioning information in the cell; and
transmit the cipher key to the user equipment in the cell and to the evolved serving mobile location center for encrypting the enhanced positioning information.

The benefit of E-SMLC based encryption approach may be that it is aligned to legacy procedure.

The drawback may be that E-SMLC must be aware of cells where encryption is not needed.

The benefit performing encryption in the base station may be that it is aligned to TSN information and does not require AMF or E-SMLC being aware of cell sharing information.

According to the embodiments described herein, some embodiments pertain to an evolved serving mobile location center for a mobile telecommunications system, including circuitry configured to:
communicate with a base station and an access mobility management function entity;
obtain a cipher key from the access mobility management function entity;
encrypt enhanced positioning assistance information with the obtained cipher key; and
transmit the encrypted enhanced positioning assistance information to the base station.

There may be no need to provide encrypted positioning assistance information in a non-shared SNPN cell. Thus, the E-SMLC should be made aware of the cell sharing agreement either directly or indirectly e.g. shared cells are part of a geographical area.

Hence, in some embodiments, the circuitry of the evolved serving mobile location center is further configured to:
obtain an indication of a cell sharing and hosting functionalities of a non-public cell and a public cell from the access mobility management function entity; and
determine to encrypt the enhanced positioning information with the obtained cipher key based on the obtained indication.

According to the embodiments described herein, some embodiments pertain to an evolved serving mobile location center for a mobile telecommunications system, including circuitry configured to:
communicate with a base station; and
transmit enhanced positioning assistance information to the base station via an LTE positioning protocol A.

Generally, from a UE point of view, there is largely no difference as to where the encryption is performed, i.e. in the base station or in the E-SMLC. A UE implementation may perform the decryption in a LPP module for encrypted positioning SIBs and this functionality may need to be also implemented in the RRC protocol module and the cipher key should be stored in a secure location in the UE.

In general, so far the gNB, i.e. a base station, in some instances, has been transparent in the encryption of positioning SIBs, but TSN information and enhanced positioning assistance information may no longer be encrypted in the E-SMLC, since not all gNBs may need to broadcast encrypted information. Hence, in some embodiments, it requires an involvement of the gNB in the encryption process.

Returning to FIG. 2, there is illustrated in a state diagram a first embodiment of an encryption and transmission of time-sensitive network information.

This embodiment is based on a deployment of a non-public network (e.g. a network slice) in a mobile telecommunications system 1 of FIG. 1A.

At 20, the UE 6 transmits a random access request including an RRC connection set up request to the BS 3 via a random access channel (this may also apply to a handover situation in the shared RAN including a handover request from a source base station (not shown) to the target BS 3, which then acknowledges the handover).

At 21, the BS 3 checks the establishment cause and accepts the request and transmits an RRC setup message to the UE 6.

At 22, the UE 6 transmits an RRC setup complete message to the BS 3 and moves to an RRC_Connected mode.

At 23a, the UE 6 sends a NAS signaling message including the subscription and credentials of the UE 6 to an access mobility management entity 7 via the BS 3, which is moved forward from the BS 3 to the AMF 7 at 23b, for determining a cipher key for an access to encrypted time-sensitive network information in the cell (which hosts and shares functionalities of the public cell 2 and the non-public cell 4).

At 24*a*, the AMF 7 transmits the response NAS signaling message including the determined cipher key via the BS 3 and the UE 6 receives the cipher key at 24*b*.

At 24*c*, the AMF 7 transmits the cipher key to the BS 3 in a message including the cipher key.

At 25, the base station obtains time-sensitive network information and obtains the cipher key from the AMF 7. Then, the BS 3 encrypts the obtained time-sensitive network information with the obtained cipher key for including the encrypted time-sensitive network information in system information, wherein the encryption is performed if the cell hosts and shares functionalities of the non-public cell 4 and the public cell 2.

At 26, the BS 3 transmits the system information including the encrypted time-sensitive network information to the UE 6 in the cell.

At 27, the UE 6 receives the encrypted time-sensitive network information from the BS 3 included in system information and decrypts it with the received cipher key.

Figure 3:
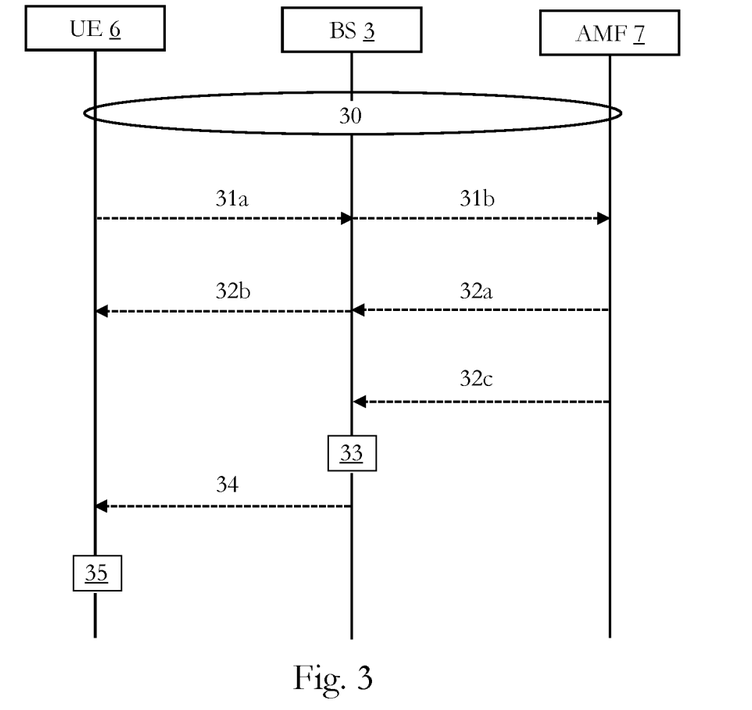
FIG. 3 illustrates in a state diagram a second embodiment of an encryption and transmission of time-sensitive network information.

FIG. 3 illustrates in a state diagram a second embodiment of an encryption and transmission of time-sensitive network information.

This embodiment is based on a deployment of a non-public network in a mobile telecommunications system 1 of FIG. 1A.

At 30, the UE 6 has obtained a cipher key from the AMF 7 as described in the embodiment of FIG. 2, but here the cipher key is associated with a validity timer based on a subscription of UE 6, which is indicative of when the validity of the cipher key expires (may indicate a date of validity, a usage time or the like). The UE 6 recognizes at 30 that the validity timer has expired and transitions to an RRC-Connected mode for determining and receiving a new cipher key in response to the expiry.

Hence, the following steps 31 to 35 correspond to the steps 23 to 27 of the embodiment of FIG. 2.

Figure 4:
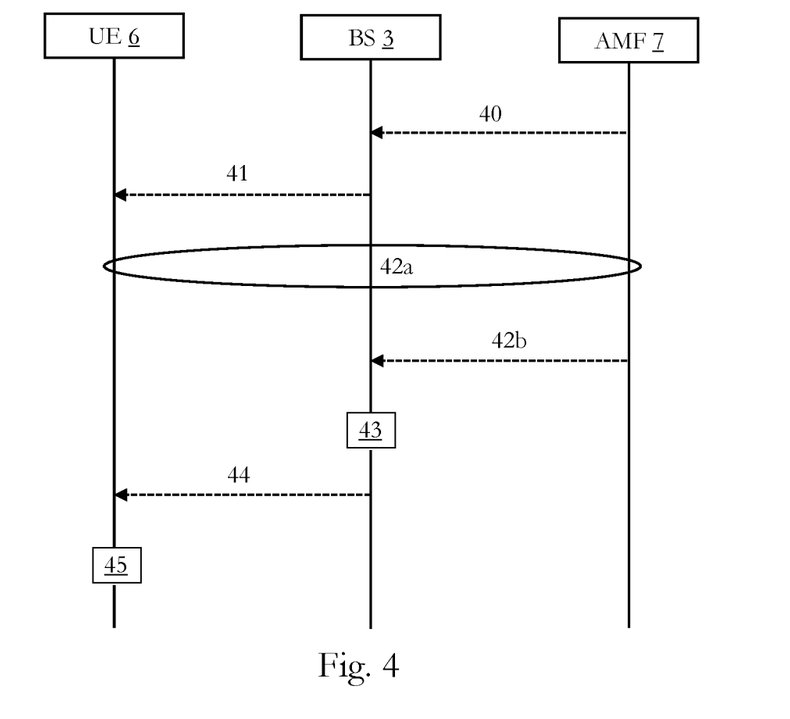
FIG. 4 illustrates in a state diagram a third embodiment of an encryption and transmission of time-sensitive network information.

FIG. 4 illustrates in a state diagram a third embodiment of an encryption and transmission of time-sensitive network information.

This embodiment is based on a deployment of a non-public network in a mobile telecommunications system 1 of FIG. 1A. It will be appreciated that the concrete deployment of the non-public network in the mobile telecommunications system may be similar to the embodiment of FIG. 1A, but that it may be appreciated that it may differ in details.

The UE 6 has obtained a cipher key from the AMF 7 as described in the embodiment of FIG. 2.

At 40, the AMF 7 changes at least one of security parameters, i.e. at least one of the cipher key, a validity period of the cipher key, a security algorithm and a counter value re-initialization and transmits an indication of a change in security parameters to the BS 3. The indication is represented by one or more bits in a message transmitted to the BS 3.

At 41, the BS 3 obtains the indication (in the form of bits included in the message received from the AMF 7) of the change in security parameters from the AMF 7 and transmits the obtained indication to the UE 6.

At 42*a*, the UE 6 obtains the indication of the change in security parameters from the BS 3 (here in the form of bits included in an associated message received from the base station 3) and transitions to an RRC_Connected mode for obtaining a new cipher key (which correspond to the steps 23*a*-24*b* of the embodiment of FIG. 2 and to the steps 31*a*-32*b* of the embodiment of FIG. 3).

At 42*b*, the new cipher key is transmitted from the AMF 7 to the BS 3 (e.g. in the form of a message which includes the cipher key or which includes a link to a location from where the cipher key can be obtained).

At 43, the BS 3 obtains time-sensitive network information and obtains the cipher key from the AMF 7 (e.g. included in a message or in the form of a link to a location from where the cipher key can be obtained). Then, the BS 3 encrypts the obtained time-sensitive network information with the obtained cipher key for including the encrypted time-sensitive network information in system information, wherein the encryption is performed if the cell shares and hosts functionalities of the non-public cell 4 and the public cell 2.

At 44, the system information is transmitted from the BS 3 to the UE 6, which receives the system information and decrypts the system information based on the new cipher key for an access to the time-sensitive network information in the cell at 45.

Figure 5:
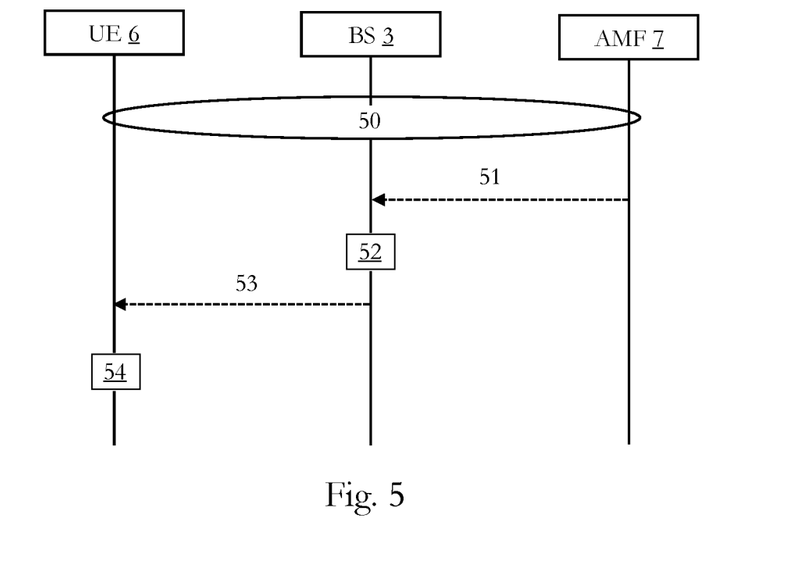
FIG. 5 illustrates in a state diagram a fourth embodiment of an encryption and transmission of time-sensitive network information.

FIG. 5 illustrates in a state diagram a fourth embodiment of an encryption and transmission of time-sensitive network information.

This embodiment is based on a deployment of a non-public network in a mobile telecommunications system 1 of FIG. 1A.

At 50, the UE 6 has obtained a cipher key from the AMF 7 as described in the embodiment of FIG. 2 or 3. Moreover, the AMF 7 has obtained an indication from the BS 3 of the cell hosting and sharing functionalities of the non-public 4 and the public cell 2 during a (NG) setup procedure and determines to transmit the cipher key to the BS 3 based on at least one of the obtained indication and an geographical area were the UE 6 is located. The indication can be transmitted in a message transmitted from the BS 3 to the AMF 7.

It is noted that if the AMF 7 decides that an encryption of the time-sensitive network information is not required, the AMF 7 does not transmit the cipher key to the BS 3 and, thus, the following steps 51 to 54 are not performed.

At 51, the AMF 7 transmits the cipher key to the BS 3.

At 52, the BS 3 obtains the time-sensitive network information and performs the encryption of the time-sensitive network information when the cipher key is obtained from the AMF 7. Then, the BS 3 encrypts the obtained time-sensitive network information with the obtained cipher key for including the encrypted time-sensitive network information in system information.

At 53, the system information is transmitted from the BS 3 to the UE 6, which receives the system information and decrypts the system information based on the new cipher key for an access to the time-sensitive network information in the cell at 54 (the cell hosting and sharing the non-public cell 4 and the public cell 2).

Figure 6:
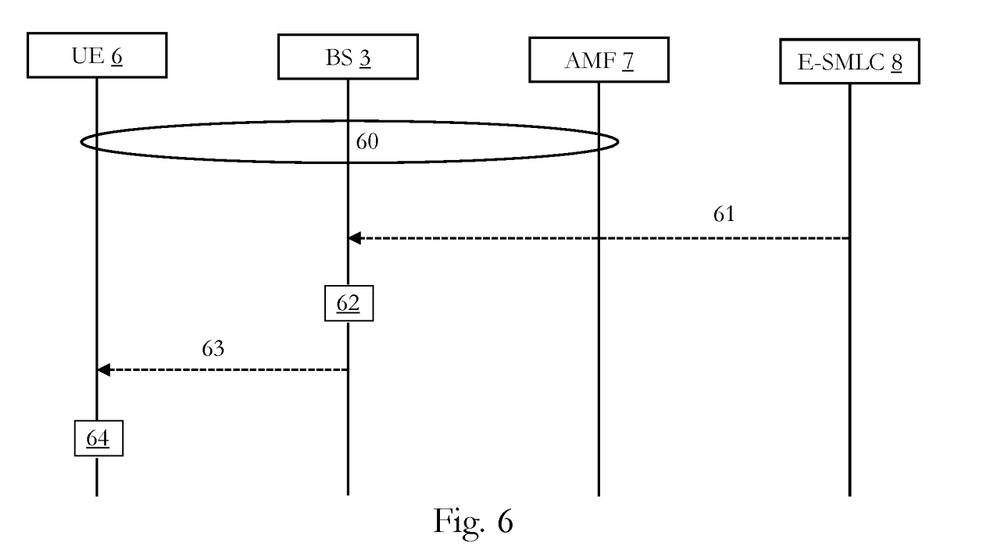
FIG. 6 illustrates in a state diagram a first embodiment of an encryption and transmission of enhanced positioning information.

FIG. 6 illustrates in a state diagram a first embodiment of an encryption and transmission of enhanced positioning information.

This embodiment is based on a deployment of a non-public network in a mobile telecommunications system 1 of FIG. 1A.

At 60, the steps 20 to 24*b* of the embodiment of FIG. 2 have been performed, which are the same as for time-sensitive network information, except that the cipher key is determined for an access to encrypted enhanced positioning assistance information in the cell. Moreover, the AMF 7 has obtained an indication from the BS 3 of the cell hosting and sharing functionalities of the non-public 4 and the public cell 2 during a (NG) setup procedure and determines to transmit the cipher key to the BS 3 based on at least one of the obtained indication and an geographical area were the UE 6 is located. As discussed, the indication can be transmitted in a message from the BS 3 to the AMF 7.

It is noted that if the AMF 7 decides that an encryption of the enhanced position assistance information is not required, the AMF 7 does not transmit the cipher key to the BS 3 and, thus, the following steps 61 to 64 are not performed.

At 61, the evolved serving mobile location center 8 transmits enhanced positioning assistance information to the BS 3 via an LTE positioning protocol A (LPPa).

At 62, the BS 3 obtains the enhance positioning assistance information and performs the encryption when the enhanced positioning assistance information is obtained from the E-SMLC 8. Then, the BS 3 encrypts the obtained enhanced positioning assistance information with the obtained cipher key for including the encrypted enhanced positioning assistance information in system information.

It is noted that in an alternative embodiment the AMF 7 does not decide if an encryption is required and transmits the cipher key to the BS 3, which then performs the encryption if the cell hosts and shares functionalities of the non-public cell 4 and the public cell 2.

At 63, the system information is transmitted from the BS 3 to the UE 6, which receives the system information and decrypts the system information based on the new cipher key for an access to the enhanced positioning assistance information in the cell at 64 (the cell hosting and sharing the non-public cell 4 and the public cell 2).

Figure 7:
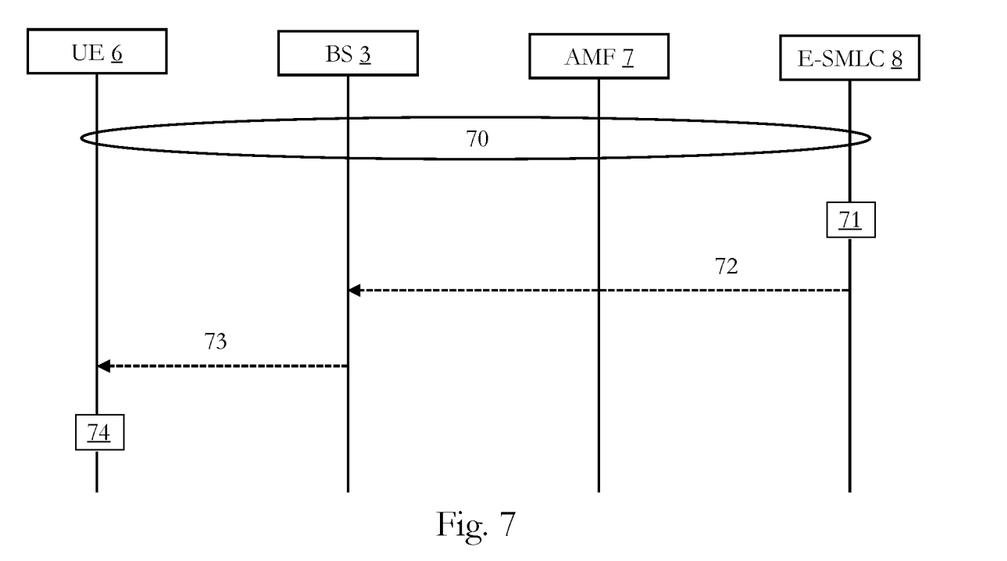
FIG. 7 illustrates in a state diagram a second embodiment of an encryption and transmission of enhanced positioning information.

FIG. 7 illustrates in a state diagram a second embodiment of an encryption and transmission of enhanced positioning information.

At 70, the steps 20 to 24b of the embodiment of FIG. 2 have been performed, which are the same as for time-sensitive network information, except that the cipher key is determined for an access to encrypted enhanced positioning assistance information in the cell. Moreover, the AMF 7 has transmitted the cipher key to an evolved serving mobile location center 8 (e.g. in a message or by provided a link to a location from where the cipher key can be obtained) and the AMF 7 has transmitted an indication of the cell hosting and sharing functionalities of the non-public cell 4 and the public cell 2 from the AMF 7, which the AMF 7 has obtained from the BS 3 during a setup procedure (e.g. NG SETUP).

It is noted that the BS 3 has not obtained the cipher key, since it has no role in the encryption process in this embodiment.

At 71, the E-SMLC 8 encrypts enhanced positioning assistance information (to which it has access as generally known) with the obtained cipher key, wherein the E-SMLC determines to encrypt the enhanced positioning assistance information based on the obtained indication.

It is noted that if the E-SMLC 8 decides that an encryption of the enhanced position assistance information is not required, the steps 71 to 74 are not performed. Instead, the enhanced position assistance information may be transmitted to the BS 3 for transmitting it to the UE 6 without any encryption.

At 72, the encrypted enhanced position assistance information is transmitted to the BS 3.

At 73, the BS 3 includes the obtained encrypted enhanced position assistance information in system information (as generally known) and transmits the system information to the UE 6.

Figure 8:
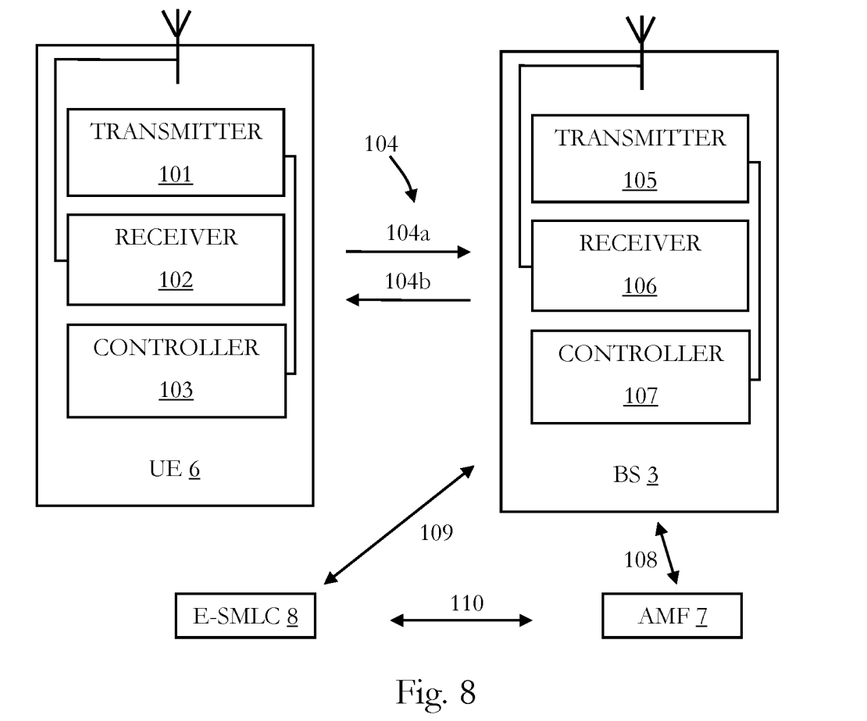
FIG. 8 illustrates in a block diagram an embodiment of a user equipment, a base station, an access mobility management function entity and an evolve serving mobile location center.

An embodiment of a UE 6, a base station (BS) 3 (e.g. NR eNB/gNB), a communication path 104 between the UE 6 and the BS 3, an access mobility management function entity 7, a communication path 108 between the BS 3 and the AMF 7, an evolved serving mobile location center 8, and communication paths 109 and 110 between the E-SLMC 8 and the BS 3 and the AMF 7, respectively, which are used for implementing embodiments of the present disclosure, is discussed under reference of FIG. 8.

The UE 6 has a transmitter 101, a receiver 102 and a controller 103, wherein, generally, the technical functionality of the transmitter 101, the receiver 102 and the controller 103 are known to the skilled person, and, thus, a more detailed description of them is omitted.

The BS 3b has a transmitter 105, a receiver 106 and a controller 107, wherein also here, generally, the functionality of the transmitter 105, the receiver 106 and the controller 107 are known to the skilled person, and, thus, a more detailed description of them is omitted.

The communication path 104 has an uplink path 104a, which is from the UE 6 to the BS 3, and a downlink path 104b, which is from the BS 3 to the UE 6.

During operation, the controller 103 of the UE 6 controls the reception of downlink signals over the downlink path 104b at the receiver 102 and the controller 103 controls the transmission of uplink signals over the uplink path 104a via the transmitter 101.

Similarly, during operation, the controller 107 of the BS 3 controls the transmission of downlink signals over the downlink path 104b over the transmitter 105 and the controller 107 controls the reception of uplink signals over the uplink path 104a at the receiver 106.

The BS 3 can communicate with the AMF 7 via the communication path 108, which can be provided by a network interface typically used for such a communication. As such a communication over a network interface is known to the skilled person, a more detailed description of it is omitted.

The BS 3 can communicate with the E-SMLC 8 via the communication path 109, which can be provided by a network interface typically used for such a communication. As such a communication over a network interface is known to the skilled person, a more detailed description of it is omitted.

The E-SMLC 8 can communicate with the AMF 7 via the communication path 110, which can be provided by a network interface typically used for such a communication. As such a communication over a network interface is known to the skilled person, a more detailed description of it is omitted.

Moreover, the AMF 7 and the E-SMLC 8 can communicate via the BS 3 with the UE 6.

Figure 9:
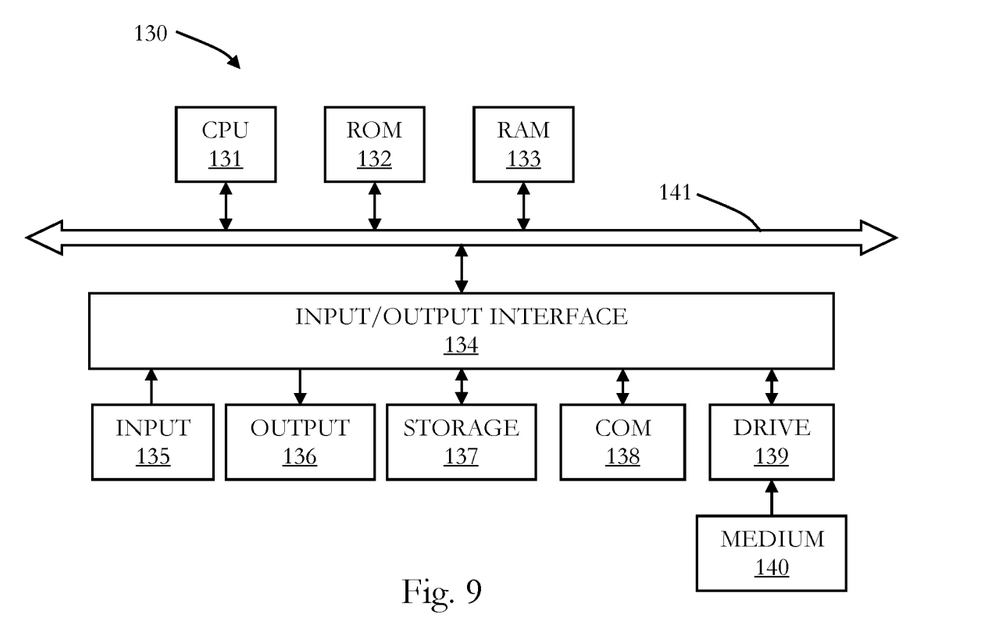
FIG. 9 illustrates in a block diagram a multi-purpose computer which can be used for implementing a user equipment, a base station, an access mobility management function entity and an evolve serving mobile location center.

In the following, an embodiment of a general purpose computer 130 is described under reference of FIG. 9.

The computer 130 can be implemented such that it can basically function as any type of user equipment, base station or new radio base station, transmission and reception point, or access mobility management function entity, or evolved serving mobile location center as described herein. The computer has components 131 to 141, which can form a circuitry, such as any one of the circuitries of the base stations, and user equipments, and the like as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE, and NR.

When the computer 130 functions as a base station, the communication interface 138 can further have a respective air interface (providing e.g. E-UTRA protocols OFDMA (downlink) and SCFDMA (uplink)) and network interfaces (implementing for example protocols such as S1-AP, GTP-U, S1-MME, X2-AP, or the like). The computer 130 is also implemented to transmit data in accordance with TCP. Moreover, the computer 130 may have one or more antennas and/or an antenna array. The present disclosure is not limited to any particularities of such protocols.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system, including circuitry configured to:
obtain time-sensitive network information or enhanced positioning assistance information;
encrypt the time-sensitive network information or the enhanced positioning assistance information for including the encrypted time-sensitive network information or the encrypted enhanced positioning assistance information in system information; and
transmit the system information to a user equipment in a cell, wherein the encryption is performed if the cell hosts and shares functionalities of a non-public cell and a public cell.

(2) A base station for a mobile telecommunications system, including circuitry configured to:
obtain time-sensitive network information or enhanced positioning assistance information;
encrypt the time-sensitive network information or the enhanced positioning assistance information for including the encrypted time-sensitive network information or the encrypted enhanced positioning assistance information in system information; and
transmit the system information to a user equipment in a cell, wherein the encryption and the transmission is performed based on commercial requirements.

(3) A base station for a mobile telecommunications system, including circuitry configured to:
obtain time-sensitive network information;
obtain a cipher key from an access mobility management function entity;
encrypt the obtained time-sensitive network information with the obtained cipher key for including the encrypted time-sensitive network information in system information; and
transmit the system information to a user equipment in a cell.

(4) A base station for a mobile telecommunications system, including circuitry configured to:
obtain enhanced positioning assistance information from an evolved serving mobile location center;
obtain a cipher key from an access mobility management function entity;
encrypt the obtained enhanced positioning assistance information with the obtained cipher key for including the encrypted enhanced positioning assistance information in system information; and
transmit the system information to a user equipment in a cell.

(5) The base station of (3) or (4), the encryption is performed if the cell hosts and shares functionalities of a non-public cell and a public cell.

(6) The base station of anyone of (3) to (5), wherein the encryption is performed when the cipher key is obtained from the access mobility management function entity.

(7) The base station of anyone of (3) to (6), wherein the cipher key is obtained from the access mobility management function entity in a message.

(8) The base station of anyone of (3) to (7), wherein the generation of the cipher key is based on a counter mechanism.

(9) The base station of anyone of (3) to (8), wherein a validity timer is associated with the obtained cipher key.

(10) The base station of anyone of (3) to (9), wherein the circuitry is further configured to:
obtain an indication of a change in security parameters from the access mobility management function entity; and
transmit the obtained indication of the change in security parameters to the user equipment in the cell.

(11) The base station of (10), wherein the security parameters include at least one of the cipher key, a validity period, a security algorithm and a counter value re-initialization.

(12) The base station of anyone of (3) to (11), wherein the circuitry is further configured to transmit an indication of the cell hosting and sharing functionalities of a non-public cell and a public cell during a setup procedure to the access mobility management function entity.

(13) The base station of anyone of (4) to (12), wherein the enhanced positioning assistance information is obtained from the evolved serving mobile location center via an LTE positioning protocol A, and wherein the encryption is performed when the enhanced positioning assistance information is obtained from the evolved serving mobile location center or if the cell hosts and shares functionalities of a non-public cell and a public cell.

(14) The base station of anyone of (5) to (13), wherein the system information transmitted to the user equipment in the cell includes information for indicating the user equipment whether the time-sensitive network information included in the system information is encrypted.

(15) The base station of anyone of (5) to (14), wherein the system information transmitted to the user equipment in the cell includes information for indicating the user equipment whether the enhanced positioning assistance information included in the system information is encrypted.

(16) An access mobility management function entity for a mobile telecommunications system, including circuitry configured to:
communicate with a base station and a user equipment in a cell;
determine a cipher key with the user equipment in the cell for an access to encrypted time-sensitive network information in cell; and
transmit the cipher key to the user equipment in the cell and to the base station for encrypting the time-sensitive network information.

(17) The access mobility management function entity of (16), wherein the circuitry is further configured to:
obtain an indication from the base station of the cell hosting and sharing functionalities of a non-public cell and a public cell during a setup procedure; and
determine to transmit the cipher key to the base station based on at least one of the obtained indication and a geographical location of the user equipment or the base station.

(18) The access mobility management function entity of (16) or (17), wherein the circuitry is further configured to transmit an indication of a change in security parameters to the base station.

(19) An access mobility management function entity for a mobile telecommunications system, including circuitry configured to:
communicate with an evolved serving mobile location center and a user equipment in a cell;
determine a cipher key with the user equipment in the cell for an access to encrypted enhanced positioning information in the cell; and
transmit the cipher key to the user equipment in the cell and to the evolved serving mobile location center for encrypting the enhanced positioning information.

(20) An evolved serving mobile location center for a mobile telecommunications system, including circuitry configured to:
communicate with a base station and an access mobility management function entity;
obtain a cipher key from the access mobility management function entity;
encrypt enhanced positioning assistance information with the obtained cipher key; and
transmit the encrypted enhanced positioning assistance information to the base station.

(21) The evolved serving mobile location center of (20), wherein the circuitry is further configured to:
obtain an indication of a cell hosting and sharing functionalities of a non-public cell and a public cell from the access mobility management function entity; and
determine to encrypt the enhanced positioning information with the obtained cipher key based on the obtained indication.

(22) An evolved serving mobile location center for a mobile telecommunications system, including circuitry configured to:
communicate with a base station; and
transmit enhanced positioning assistance information to the base station via an LTE positioning protocol A.

(23) A user equipment for a mobile telecommunications system, including circuitry configured to:
communicate with a base station and an access mobility management function;
determine a cipher key with the access mobility management function entity for an access to encrypted time-sensitive network information in a cell;
receive encrypted time-sensitive network information from the base station or encrypted enhanced assistance positioning information included in system information; and
receive the cipher key from the access mobility management function entity for decrypting the respective received encrypted time-sensitive network information or the received encrypted enhanced assistance positioning information.

(24) The user equipment of (23), wherein the circuitry is further configured to:
determine whether the time-sensitive network information or the enhanced assistance positioning information included in the system information is encrypted based on information included in the system information.

(25) The user equipment of (23) or (24), wherein the circuitry is further configured to:
determine its capability to decrypt the received encrypted time-sensitive network information or encrypted enhanced positioning assistance information included in the system information based on the received cipher key.

(26) The user equipment of (25), wherein a validity timer is associated with the cipher key, and wherein the user equipment transitions to an RRC_Connected mode for determining and receiving a new cipher key in response to an expiry of the validity timer based on a subscription of the user equipment.

(27) The user equipment of (25) or (26), wherein the circuitry is further configured to obtain an indication of a change in security parameters transmitted from the base station, and wherein the user equipment transitions to an RRC_Connected mode for obtaining a new cipher key or new security parameters in response to the obtained indication.

The invention claimed is:

1. A base station for a mobile telecommunications system, comprising circuitry configured to:
receive a random access request from a user equipment (UE);
transmit a radio resource control (RRC) setup message to the UE;
send a non-access stratum (NAS) signaling message including subscription and credentials to an access mobility management function (AMF) entity received from the UE for determining a cipher key for access to encrypted time-sensitive network information or enhanced positioning assistance information in a cell hosting and sharing functionalities of a non-public cell and a public cell during a NG setup procedure;
send a response NAS signaling message to the UE from the AMF entity;
obtain the time-sensitive network information or the enhanced positioning assistance information, the time-sensitive network information or the enhanced positioning assistance information being based on at least one of a geographical area or from the base station of the cell;
selectively encrypt the time-sensitive network information or the enhanced positioning assistance information for including the encrypted time-sensitive network information or the encrypted enhanced positioning assistance information in system information based on a deployment of a non-public mobile telecommunications system; and
transmit the system information to the user equipment in the cell,
wherein the circuitry is further configured to:
generate a public cell and a non-public cell,
transmit an indication of the cell hosting and sharing functionalities of the non-public cell and the public cell during a setup procedure to the AMF entity where a non-public mobile telecommunications system (NPN) operator and a public mobile telecommunications system (PN) operator share the cell, and
selectively encrypt the time-sensitive network information or the enhanced positioning assistance information only in response the cell hosting and sharing functionalities of the non-public cell and the public cell.

2. A base station for a mobile telecommunications system, comprising circuitry configured to:
receive a random access request from a user equipment (UE);
transmit a radio resource control (RRC) setup message to the UE;
send a non-access stratum (NAS) signaling message including subscription and credentials to an access mobility management function (AMF) entity received from the UE for determining a cipher key for access to encrypted time-sensitive network information in a cell;
send a response NAS signaling message to the UE from the AMF entity, including the determined cipher key for access to the encrypted time-sensitive network information or enhanced positioning assistance information in the cell hosting and sharing functionalities of a non-public cell and a public cell during a NG setup procedure;
obtain time-sensitive network information or the enhanced positioning assistance information and the cipher key, the time-sensitive network information or the enhanced positioning assistance information being based on at least one of a geographical area or an obtained indication from the base station of the cell;
selectively encrypt the time-sensitive network information or the enhanced positioning assistance information for including the encrypted time-sensitive network information or the encrypted enhanced positioning assistance information in system information based on a deployment of a non-public mobile telecommunications system; and
transmit the system information to the user equipment in the cell,
wherein the circuitry is further configured to:
generate a public cell and a non-public cell,
transmit an indication of the cell hosting and sharing functionalities of the non-public cell and the public cell during a setup procedure to the AMF entity where a non-public mobile telecommunications system (NPN) operator and a public mobile telecommunications system (PN) operator share the cell, and
selectively encrypt the time-sensitive network information or the enhanced positioning assistance information only in response the cell hosting and sharing functionalities of the non-public cell and the public cell.

3. The base station according to claim 2, wherein the encryption is performed when the cipher key is obtained from the access mobility management function entity.

4. The base station according to claim 2, wherein the generation of the cipher key is based on a counter mechanism.

5. The base station according to claim 2, wherein a validity timer is associated with the obtained cipher key.

6. The base station according to claim 2, wherein the circuitry is further configured to:
obtain an indication of a change in security parameters from the AMF; and
transmit the obtained indication of the change in security parameters to the user equipment in the cell.

7. The base station according to claim 6, wherein the security parameters include at least one of the cipher key, a validity period, a security algorithm and a counter value re-initialization.

8. The base station according to claim 2, wherein the system information transmitted to the user equipment in the cell includes information for indicating the user equipment whether the time-sensitive network information included in the system information is encrypted.

9. The base station according to claim 2, wherein the system information transmitted to the user equipment in the cell includes information for indicating the user equipment whether the enhanced positioning assistance information included in the system information is encrypted.

* * * * *